United States Patent [19]

LeSota

[11] Patent Number: 5,073,582
[45] Date of Patent: Dec. 17, 1991

[54] MILDEW RESISTANT PAINT COMPOSITIONS COMPRISING AN ISOTHIAZOLONE AND A WATER-INSOLUBLE COPPER COMPOUND, ARTICLES, AND METHODS

[75] Inventor: Stanley LeSota, Horsham, Pa.

[73] Assignee: Rohm and Haas Company, Philadelphia, Pa.

[21] Appl. No.: 377,984

[22] Filed: Jul. 11, 1989

[51] Int. Cl.$^5$ ............................ C08L 1/26; C08K 5/46
[52] U.S. Cl. ........................................ 524/44; 524/83; 524/84; 524/445; 524/497; 523/122; 106/18.32; 548/213
[58] Field of Search ............ 548/213; 524/44, 84, 524/83, 445, 497; 523/122; 160/18.32

[56] References Cited

U.S. PATENT DOCUMENTS

| | | | |
|---|---|---|---|
| 3,523,121 | 8/1970 | Lewis et al. | 260/306.7 |
| 3,761,488 | 9/1973 | Lewis et al. | 260/300 |
| 3,870,795 | 3/1975 | Miller et al. | 514/372 |
| 4,031,055 | 6/1977 | Dupont et al. | 523/122 |
| 4,067,878 | 1/1978 | Miller et al. | 260/302 A |
| 4,129,448 | 12/1978 | Greenfield | 524/83 |
| 4,150,026 | 4/1979 | Miller et al. | 260/299 |
| 4,165,318 | 8/1979 | Greenfield | 260/302 A |
| 4,241,214 | 12/1980 | Miller et al. | 548/101 |
| 4,310,590 | 1/1982 | Petigara | 514/342 |
| 4,608,183 | 8/1986 | Rossmore | 252/36 |
| 4,783,221 | 11/1988 | Grove | 106/18.22 |

*Primary Examiner*—Nathan M. Nutter
*Attorney, Agent, or Firm*—Michael B. Fein

[57] ABSTRACT

A mildew-resistant paint composition comprising a film-forming, non-wood penetrating organic polymeric paint vehicle; an isothiazolone mildewcide compound; and a stabilizing amount of a water insoluble organic soluble copper compound; articles comprising a substrate coated with said paint composition; and methods of stabilizing isothiazolones in paint compositions are disclosed.

10 Claims, No Drawings

MILDEW RESISTANT PAINT COMPOSITIONS COMPRISING AN ISOTHIAZOLONE AND A WATER-INSOLUBLE COPPER COMPOUND, ARTICLES, AND METHODS

BACKGROUND OF THE INVENTION

1. Field of the Invention

This invention relates to mildew resistant paint compositions comprising isothiazolone compounds.

2. Description of the Prior Art

Isothiazolones are well known mildewcides for film forming compositions. Isothiazolones are generally unstable without the addition of a stabilizer. In aqueous paint formulations, copper nitrate is a well known stabilizer for isothiazolones.

U.S. Pat. Nos. 3,870,795 and 4,067,878 teach the stabilization of isothiazolones against chemical decomposition by addition of a metal nitrite or metal nitrate salts, but teach that other common metal salts, including carbonates, sulfates, chlorates, perchlorates, and chlorides are ineffective in stabilizing solutions of isothiazolones, such solutions usually being in water or in an hydroxylic solvent and immiscible with solvent-soluble isothiazolones. Salts of organic carboxylic acids of more than six carbon atoms with copper are not taught or considered in these patents.

U.S. Pat. Nos. 4,150,026 and 4,241,214 teach metal salt complexes of isothiazolones useful because of their enhanced thermal stability, while retaining biological activity. The metal salts listed do not include salts of organic carboxylic acids of more than six carbon atoms with copper, or complexes of copper with organic-soluble reagents.

U.S. Pat. No. 4,608,183 teaches synergistic biocidal mixture of isothiazolones and a metal complex with a polyfunctional ligand, requiring that the metal complex itself be a biocide. Illustrated specifically is the water-soluble cupric disodium citrate. It is known to use certain organic stabilizers for isothiazolones, generally for use situations where metal salts may create problems, such as corrosion, coagulation of latices, insolubility in non-aqueous media, interaction with the substrate to be stabilized, and the like. Formaldehyde or formaldehyde-releasing chemicals are known stabilizers, (see U.S. Pat. Nos. 4,165,318 and 4,129,448).

In certain applications, however, it is desirable to avoid addition of organic stabilizers by virtue of their volatility, decomposition under high heat, higher cost, difficulty in handling, potential toxicity, and the like. Formaldehyde is a suspected carcinogen, and it is desirable not to use formaldehyde or formaldehyde releasing chemicals in applications where contact with human skin or lungs may occur.

In actual use, copper salts of inorganic acids, such as copper (II) sulfate or nitrate, have proved efficacious in stabilization of isothiazolones. However, water-soluble inorganic copper salts are undesirable in effluent streams in such operations as in the manufacture of stabilized isothiazolones or in their blending into a product or the use of that product. Such water-soluble copper salts, especially the chlorides, may contribute to possible corrosion, or in the presence of polymers in aqueous dispersion may lead to coagulation of the dispersion. The water-soluble salts may not be readily miscible with certain of the water-insoluble isothiazolones, leading to separation and lowering of stability of a stabilizer concentrate.

Grove, U.S. Pat. No. 4,783,221 shows metal salts of organic carboxylic acids containing at least 6 carbon atoms wherein the metal is selected from the group consisting of copper and other transition metals, zinc, antimony, and lead, with an isothiazolone compound, and a solvent/diluent to preserve wood.

SUMMARY OF THE INVENTION

It is therefore an object of the present invention to provide a mildew-resistant paint composition which avoids the problems of previous metal salt stabilizers.

These objects, and others as will become apparent from the following description, are achieved by the present invention which comprises a mildew-resistant paint composition comprising a film-forming, non-wood penetrating, organic polymeric paint vehicle; an isothiazolone of the formula:

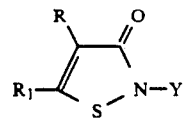

wherein Y is substituted or unsubstituted alkyl, unsubstituted or halo substituted alkenyl or alkynyl, unsubstituted or substituted cycloalkyl, unsubstituted or substituted aralkyl, or hydrogen, and R and $R_1$ are hydrogen, chloro, or methyl; and a stabilizing amount of a water-insoluble, organic solvent-soluble copper compound. In another aspect, the invention comprises an article comprising a substrate coated with the mildew resistant film composition.

In yet another aspect, the invention comprises a method of imparting mildew resistance to a coating composition comprising an isothiazolone mildewcide which comprises incorporating about 5 to 100 ppm of copper metal cation as an oil soluble copper compound.

DETAILED DESCRIPTION OF THE INVENTION AND THE PREFERRED EMBODIMENTS

The isothiazolones useful in the invention are well known and are described in U.S. Pat. Nos. 3,523,121 and 3,761,488. Highly preferred isothiazolone are 2-octyl-3-isothiazolone and 4,5-dichloro-2-octyl-3-isothiazolone. It has been found that some chlorinated isothiazolones are not stabilized by the oil soluble copper compounds used in this invention.

The oil soluble copper compounds useful in the paint compositions, articles and methods of this invention are copper salts of organic carboxylic acids which are water insoluble and organic solvent soluble, i.e., oil soluble. Preferred copper compounds are copper salts of organic carboxylic acids, and the preferred copper compound is copper alkanoate (mixture of about ($C_7$–$C_{13}$) alkyl carboxylates). Others which are suitable are copper hexanoate, heptanoate, decanoate, dodecanoate, dodecenoate, cyclohexylcarboxylate, tetrahydrobenzoate, naphthenate, 2-ethylhexanoate (also known as "octoate"), neodecanoate, oleate, benzoate, salts of disproportionated rosin acid, 2-phenylethanoate, and the like.

Solvents may be used to dissolve the isothiazolones and may be any organic solvent which is miscible with the isothiazolones, is compatible with the proposed end use, does not destabilize the isothiazolone, and does not react with the copper salt to eliminate its stabilizing action.

Hydroxylic solvents, for example, polyols, such as glycols, monoethers of glycols, alcohols, and the like, may be used. An hydroxylic coalescent, such as Texanol (trimethyl-1,3-pentanediol monoisobutyrate) also may be used. In certain formulations, hydrocarbons, either aliphatic or aromatic, are useful solvents. Typical solvents are dipropylene glycol, dipropylene glycol monoethyl ether, xylene, mineral spirits, and the like. Solvents may be used in admixture as long as the copper salt remains soluble or is well dispersed enough so as to be added conveniently and uniformly to the test formulation.

The amounts of copper salt employed will vary depending on use conditions and concentrations of the isothiazolone in the mixture. In more concentrated solutions, effective amounts of copper salt based on isothiazolone are in the ratios of from about 1:50 to about 2:1. Obviously higher amounts may be used, but at additional cost. At high levels of dilution of the isothiazolone (such as from 1 to 2 percent isothiazolone in the solvent), the ratio of stabilizer to isothiazolone can range from about 1:10 to about 3:1.

Other salt stabilizers such as those described in U.S. Pat. Nos. 3,870,795; 4,067,878; 4,150,026 and 4,241,214 can also be included.

Because the preferred isothiazolones and the stabilizers of the present invention are both organic-soluble and water-insoluble, they may be used in aqueous dispersions or latices, as both will diffuse into the organic polymer and be efficacious when the polymer is isolated by drying of the latex to form a film. The preferred isothiazolones and stabilizers of the present invention may also be used in oil or alkyd paint formulations.

It is known in the art that the performance of biocides can frequently be enhanced by combination with one or more other biocides. In fact, there have been numerous examples of synergistic combinations of biocides. Thus, other known biocides may be combined advantageously with the stabilized isothiazolones of this invention.

The isothiazolone and copper compound may be separately blended into the paint to be stabilized or, preferably, the isothiazolone and the copper compound, with or without organic solvent, may be precombined into a single package or solution before being added to the paint to be stabilized. The single package combination of isothiazolone, copper compound, and optional organic solvent offers the advantage of improved control of the ratio of isothiazolone to copper compound being added to the paint since a single operation is involved rather than the several steps involved when each ingredient is added separately; in addition, the paint formulator will require only one storage vessel for single-package formulations, rather than the several which would be required if each component were to be supplied separately; also, a one-step operation is inherently simpler than the multistep process of adding each ingredient separately where the chance for spillage or error is increased.

The following examples illustrate a few embodiments of the present invention. All percentages are by weight unless otherwise specified.

EXAMPLE 1

This example illustrates the preparation of solutions of 4,5-dichloro-2-n-octyl-3-isothiazolone stabilized with copper alkanoate.

A mixture of 28 parts 4,5-dichloro-2-n-octyl-3-isothiazolone, 1.5 parts 2-n-octyl-3-isothiazolone, and xylene 66 parts was combined with 4.5 parts of a 55% solution of mixed alkanoates(centering around the octoate) of copper dissolved in 40% mineral spirits (a mixture of $C_7$ to $C_9$ hydrocarbons), 2% dipropylene glycol monomethyl ether and 10% copper as metal. The blend can be added directly to a paint formulation, or may be stored for later addition.

EXAMPLE 2

This example illustrates a paint formulation free of zinc oxide.

| Material | lb/50 gal | g/L |
|---|---|---|
| Natrosol 250 MHR hydroxyethyl cellulose | 1.5 | 3.6 |
| Ethylene glycol | 12.5 | 30 |
| Premix | — | |
| Water | 56.0 | 134.4 |
| (40%) poly(methacrylic acid) pigment dispersant | 3.6 | 8.6 |
| Potassium tripolyphosphate codispersant | 0.75 | 1.8 |
| Nonionic surfactant | 1.3 | 3.1 |
| Defoamer | 0.5 | 1.2 |
| Propylene glycol | 17.0 | 40.8 |
| Rutile titanium dioxide | 112.5 | 270 |
| Anhydrous Na K aluminum silica filler pigment | 79.7 | 191.3 |
| Calcined clay filler pigment | 25.0 | 60 |
| Attapulgite clay thixotrope | 2.5 | 6 |

The mixture is milled for 10 to 15 minutes in a Cowles Dissolver at 3800–4500 fpm and the following ingredients are then added at slower speed as follows:

| Let Down: | | |
|---|---|---|
| Acrylic latex (60.5%) | 153.0 | 367.1 |
| Defoamer | 1.5 | 3.6 |
| 2,2,4-trimethylpentane-1,3-diol monoisobutyrate coalescent | 4.7 | 11.3 |
| Mildewcide components | | |
| Ammonia (28%) | 1.16 | 2.8 |
| Hydroxyethyl cellulose solution (2.5%) | 53.50 | 128.4 |
| Water | 54.46 | 130.7 |
| | 581.17 | 1394.8 |

Materials Employed in Studies

The stabilization studies were done with a variety of isothiazolones. These are prepared by methods taught in U.S. Pat. Nos. 3,523,121 and 3,761,488. The materials studied in paints were:

| Mildewcide | Chemical |
|---|---|
| A | 4,5-dichloro-2-n-octyl-3-isothiazolone |
| B | 2-n-octyl-3-isothiazolone |
| C | 5-chloro-2-(2-(4-chlorophenyl)ethyl)-3-isothiazolone |
| D | 5-chloro-2-(2-phenylethyl)-3-isothiazolone |
| E | 5-chloro-2-(4'-chlorobenzyl)-3-isothiazolone |

EXAMPLE 3

In most of the experiments performed to show the stabilizing action of the cooper salt on the isothiazolone, the additives are not separately admixed, but are blended into the paint by addition with stirring, first of the isothiazolone and then of the copper salt.

This example illustrates copper alkanoate stabilization of the paint formulation of Example 2.

The isothiazolone mildewcide from the above formulations, or a control in which no copper alkanoate is present, is admixed with the paint so as to introduce a certain ppm of the metal cation. The stabilizer is well-mixed into the paint, and the paint then heat-aged at 60° C. for 10 days. The samples, along with a room temperature control, separately shown to have retained essentially all of the active ingredient (a.i.), were extracted with a 9-fold volume excess of propylene glycol with intensive shaking for one minute and slower shaking for one hour. High-pressure liquid chromatography is used to identify the amount of a.i. A level of a.i. above 75% retention is judged acceptable for commercial storage. Duplicate results are on repeat samplings of the same experiment. Results are shown in Table 1.

TABLE 1

| Mildewcide | Concentration in Paint Mildewcide g/L | Concentration in Paint Copper Alkanoate ppm Cu metal cation | Aging Results % a.i. retained |
|---|---|---|---|
| A | 4.0 | 0 | 0 |
| A | 4.0 | 28 | 93, 100 |
| A | 8.0 | 28 | 96 |
| B | 2.4 | 0 | 0, 46 |
| B | 1.2 | 7 | 100 |
| B | 2.4 | 14 | 88 |
| B | 3.6 | 21 | 92 |
| B | 4.8 | 28 | 99, 98 |
| B | 2.4 | 28 | 96, 100 |

EXAMPLE 4

Similar stabilization studies of Mildewcide A in the same paint formulation are conducted with commercially available alkanoates of calcium, magnesium, lithium and zirconium at levels up to 2000 ppm of metal. No stabilization of the mildewcide was observed; % a.i. was zero after heat aging.

EXAMPLE 5

When the formulations of Example 3 containing Mildewcide A (4.0 or 8.0 grams/L) with 28 ppm of copper metal cation are applied as paint and tested by accelerated weathering, they will be found to have stability to weathering, as judged by appearance, at least equivalent to a commercially acceptable formulation containing zinc oxide and Mildewcide B.

EXAMPLE 6

This example illustrates the stabilizing effect of copper alkanoate on several isothiazolone in the paint formulation of Example 2, but with only 1.1 grams/liter of mildewcide. It is noted that the copper alkanoate is effective at levels lower than those which can cause staining; the exception is Mildewcide E.

The stabilization achieved for the copper alkanoate is equivalent to that achieved by an equal amount of copper supplied as copper nitrate, yet the presence of water-soluble copper salts is avoided. With Mildewcide B, the stabilization is equivalent to that obtained with a larger amount (at least 10-fold by weight) of zinc oxide. Results are shown in Table 2.

TABLE 2

| Mildewcide 1.1 gm/liter | Concentration in Paint Copper Alkanoate (ppm Cu metal cation) | Aging Results % a.i. retained |
|---|---|---|
| B | 0 | 0, 11, 33, 46 |
| B | 3 | 45 |
| B | 7 | 82 |
| B | 14 | 95, 98 |
| B | 28 | 96, 100 |
| A | 0 | 0 |
| A | 14 | 73 |
| A | 28 | 93, 95, 100 |
| C | 0 | 0 |
| C | 14 | 0, 6 |
| C | 28 | 80, 84, 87, 95 |
| D | 0 | 0 |
| D | 28 | 58 |
| D | 56 | 75 |
| E | 0 | 0 |
| E | 14 | 0 |
| E | 28 | 0 |

EXAMPLE 7

This example illustrates that immiscible mixtures of isothiazolone and stabilizer result from the use of a water-soluble salt, but miscibility is achieved with a water-insoluble copper salt.

The following solutions were used:

| | |
|---|---|
| Stabilizer Solution SS-1 | 10 parts copper nitrate, 90 parts water |
| Stabilizer Solution SS-2 | 55 parts copper alkanoate, 2 parts dipropylene glycol monomethyl ether, 40 parts mineral spirits |
| Mildewcide Solution SM-1 | 15 parts Mildewcide D, 56.6 parts Solvesso 100 hydrocarbon/28.4 parts monobutyl ether of ethylene glycol |
| Mildewcide Solution SM-2 | 30 parts Mildewcide A, 70 parts xylene |
| Mildewcide Solution SM-3 | 48.7 parts Mildewcide B, 51.3 parts propylene glycol |
| Mildewcide Solution SM-4 | 48.7 parts Mildewcide B, 51.3 parts dipropylene glycol |

To a container was added weights of the stabilizer and mildewcide solutions as shown in the following table. Miscibility was visually measured and judged after intensive stirring and allowing to stand overnight.

| Stabilizer | Solution Wt. % | Mildewcide | Wt. % | Miscibility |
|---|---|---|---|---|
| SS-1 | 18 | SM-1 | 82 | immiscible |
| SS-1 | 33 | SM-2 | 67 | immiscible |
| SS-1 | 15 | SM-3 | 85 | immiscible |
| SS-1 | 15 | SM-4 | 85 | immiscible |
| SS-2 | 5 | SM-1 | 95 | miscible |
| SS-2 | 10 | SM-2 | 90 | miscible |
| SS-2 | 15 | SM-3 | 85 | sediment |
| SS-2 | 15 | SM-4 | 85 | miscible |

While the invention has been described with reference to specific examples and applications, other modifications and uses for the invention will be apparent to those skilled in the art without departing from the spirit and scope of the invention defined in the appended claims.

What is claimed is:

1. In a mildew-resistant coating composition comprising:

a) a film-forming, non-wood penetrating, organic polymeric coating composition; and
b) an isothiazolone of the formula:

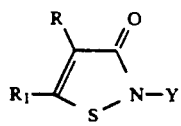

wherein Y is substituted or unsubstituted alkyl of 1 to 18 carbon atoms, unsubstituted or halo substituted lower alkenyl or lower alkynyl, unsubstituted or substituted cycloalkyl of 3 to 6 carbon atoms, unsubstituted or halogen, lower alkyl, or lower alkoxy-substituted aralkyl of up to 10 carbon atoms, or hydrogen, and R and $R_1$ are hydrogen, chloro, or methyl; the improvement comprising use of an amount of a water-insoluble, organic solvent-soluble copper compound sufficient to stabilize said isothiazolone.

2. The method of claim 1 wherein said copper compound is a copper salt of an organic carboxylic acid.

3. The method of claim 2 wherein the said carboxylic acid is a saturated or unsaturated aliphatic or cycloaliphatic acid of at least six carbon atoms.

4. The method of claim 3 wherein the copper salt (c) is selected from the group consisting of copper alkanoate and copper naphthenate.

5. The method of claim 1 which comprises from 0.01 to 99.9999 parts of said isothiazolone (b) and from 0.0001 and 99.99 parts of said copper compound (c).

6. The method of claim 5 which comprises form 5 to 40 parts of said isothiazolone and from 60 to 95 parts of said copper compound.

7. The method of claim 1 which comprises from about 0.01 to about 50 parts of said isothizolone (b); from about 0.0001 to about 10 parts of said copper compound (c), and which further comprises from about 40 to about 99.9899 parts of a solvent.

8. The method of claim 7 which comprises from 1 to 25 parts of (b), from 0.1 to 10 parts of (c) and from 65 to 98.9 parts of the solvent.

9. The method of claim 7 wherein the solvent is chosen from the group consisting of aliphatic hydrocarbons, aromatic hydrocarbons, dihydric alcohols, and monoalkyl ethers of dihydric alcohols.

10. The method of claim 1 wherein said isothiazolone is selected from the group consisting of 2-octyl-3-isothiazolone, 4,5-dichloro-2-octyl-3-isothiazolone, 5-chloro-2-(2-4(chlorophenyl)ethyl-3-isothiazolone, and 5-chloro-2-(2-phenylethyl)-3-isothiazolone.

* * * * *